Patented May 18, 1948

2,441,794

UNITED STATES PATENT OFFICE 2,441,794

STABILIZING GLYCOLS

Edgar C. Britton and Arthur R. Sexton, Midland, Mich., assignors to The Dow Chemical Company, Midland, Mich., a corporation of Delaware No Drawing. Application August 6, 1945, Serial No. 609,318

10 Claims. (Cl. 252—73)

This invention relates to stabilizing lower alkylene glycols against thermal decomposition.

In certain types of aircraft and automotive engines, the liquid coolant, instead of running at the conventional temperature of 100° C. or less, commonly circulates at 150° C. in a closed system, and may occasionally reach 200° C. or higher, perhaps for an extended period. The problem of selecting a coolant which will operate satisfactorily at these temperatures and yet will not freeze even at extreme winter temperatures is a difficult one. Ethylene glycol, undiluted or together with a lesser proportion of water, is most frequently chosen as the coolant, but it has the undesirable property of decomposing slowly at the higher temperatures mentioned to form carbon and gummy tars, which ultimately foul the heat-transfer surfaces and throttle circulation. In consequence, with ethylene glycol coolants, periodic overhauling of the circulating system is necessary, sometimes at short intervals.

In an effort to provide a more satisfactory liquid coolant for operation at higher temperatures, it has now been found that the lower alkylene glycols, such as ethylene glycol, may be stabilized against thermal decomposition of the type mentioned by incorporating therein a small proportion of a wood oil derived from the distillation of hardwood or an autocondensate of such an oil. These substances almost completely restrain thermal decomposition of the glycols, both in the undiluted state and in mixtures thereof with the same or a lesser weight of water, at temperatures up to 200° C., and very markedly retard decomposition even when the glycols are maintained liquid under pressure at temperatures as high as 300° C.

Glycol compositions stabilized in accordance with the invention not only are useful as coolants for internal combustion engines but are satisfactory as liquid heat-transfer agents in general at temperatures within the range mentioned. They are characterized by extremely low freezing points, good heat-transfer characteristics, and moderate viscosities, as well as thermal stability. The compositions may also be used as fluid pressure- and power-transmitting media.

The lower alkylene glycols to which the invention is applicable contain from two through five carbon atoms per molecule. Of these, ethylene glycol, and to a lesser extent industrial mixtures of propylene glycols and of butylene glycols, are of present commercial interest. Such glycols may be employed according to the invention in the undiluted state or mixed with an equal or lesser weight of water. With larger proportions of water the boiling points of the solutions are somewhat low for a high temperature fluid, and thermal decomposition is rarely a serious problem.

In so far as is known, any of the wood oils derived from the distillation of hardwood, or the autocondensates produced by heating such oils, may be employed as stabilizers for glycols according to the invention. Of these oils, the one known as washed allyl oil, and its autocondensate, are perhaps the most effective.

In the hardwood distillation industry, the pyroligneous liquor, after the removal of settled tars, is subjected to a rough distillation in which the overhead fraction is crude methanol containing the alcohol oils, and the residue is crude acetic acid together with the acid oils. A number of different alcohol oil fractions are separated from the crude methanol by rectification, and several other oils, generally termed light oils and heavy oils, are recovered from the crude acetic acid and from the settled tar. All these fractions, which are complex mixtures of organic compounds, are included within the term "wood oils" as generally used, and are available as articles of commerce. The details of producing these individual oils are well known in the art, and are discussed, for example, in U. S. Patents 1,975,091 and 2,223,299. All such oils are useful as thermal stabilizers for glycols, with the alcohol oils being preferred.

In the rectification of crude methanol, as well as of the pyroligneous acid itself, after the commercial methyl acetone and methanol have been distilled, there is obtained a fraction boiling higher than these latter, but lower than acetic acid, the cut usually being made near 70° C. This fraction, which is known as wood spirits residue (U. S. 2,176,055), is the source of the washed allyl oil which is a preferred stabilizer according to the invention. In separating the latter, the wood spirits residue is first mixed with a roughly equal volume of water to remove soluble materials, particularly allyl alcohol, leaving an insoluble portion known as raw allyl oil. This raw oil is then mixed with aqueous sodium hydroxide in a quantity sufficient to neutralize any acids and to saponify esters present, the mixture being heated slightly until reaction ceases. The remaining oily layer, which consists, at least in part, of water-insoluble unsaturated alcohols together with aldehydes and ketones, boils over the range of approximately 80° to 185° C., and is known as washed allyl oil. If desired, it may be steam-distilled to separate it from traces of high-boiling tars.

While the wood oils are themselves effective stabilizers for glycols, they may, if desired, be subjected to autocondensation to produce higher boiling mixtures which are at least equally effective. To this end, a given wood oil, e. g., washed allyl oil, may be heated at an elevated temperature, usually at least 200° C., in a closed vessel, either without or with a condensing catalyst such as sulfuric acid, until reaction ceases. The resulting autocondensate is then used directly, or purified by steam-distillation.

In preparing thermally stabilized glycol compositions according to the invention, the wood oil or its autocondensate is simply stirred into the undiluted or aqueous glycol, in which it is soluble to a limited extent. Alternatively, the wood oil stabilizer may be made up as a strong solution in a mutual solvent, such as alcohol, and the solution stirred into the glycol. A small proportion of the wood oil or autocondensate is all that is required to effect stabilization, 0.2 to 5 per cent by weight of the glycol usually being satisfactory, with 0.5 per cent or more being preferred.

The wood oils and their condensates, in addition to preventing carbon and tar formation in heated glycols and glycol-water mixtures, also minimize corrosion of metals by these liquids because of the fact that they almost completely restrain development of strongly acidic substances by decomposition of the glycols. They also function to a moderate degree as inhibitors in the conventional sense of retarding the corrosion of metals by other agents, such as air, which may be dissolved in the glycol solution. However, when extremely corrosive conditions are to be encountered, it is preferable to rely on the wood oils as thermal stabilizers only, and to introduce in addition a small proportion of a conventional corrosion inhibitor. Since many such inhibitors are themselves unstable or volatile at temperatures of 200° to 300° C., it is important to select an inhibitor which is not affected adversely by heating. Sodium silicate, usually from 0.5 to 5 per cent by weight of the glycol, is a preferred choice.

While the heat-transfer media of the invention ordinarily consist of the glycol and the stabilizer, with or without water, minor proportions of other ingredients, such as anti-foaming agents, leak-stopping compounds, and dyes, as well as the conventional inhibitors already mentioned, may be added as desired.

The following examples will serve to illustrate the invention, but are not to be construed as limiting its scope. In the examples, a testing apparatus was employed consisting of an electrically heated closed iron chamber of about 400 cc. capacity and a circulating system for withdrawing the liquid being tested from a reservoir, forcing it under a pressure of 100 to 120 pounds per square inch into one end of the heated chamber, removing it from the other end of the chamber through a relief valve, cooling it, and returning it to the reservoir. The rate of circulation was controlled at about 800 cc. per hour. Weighed polished test specimens of aluminum, iron, brass, and copper were placed in the heated chamber throughout each run. The purposes of the metal specimens were to have present in the system the metals normally used in liquid-cooled engines and also to observe the rates of corrosion of the metals.

In the examples, the washed allyl oil was obtained from hardwood distillation as described above. The autocondensed washed allyl oil was produced by heating washed allyl oil at 245° C. for 2 hours in a closed iron vessel.

*Example 1.—Aqueous mixtures at 200° C.*

In each of the test runs summarized in the Table, the system was filled with the given volume of a mixture of 70 parts by weight of ethylene glycol and 30 parts of water, to which (except in the case of the blank) 0.5 part of the stabilizer listed was added. The chamber was maintained at 200° C. and circulation of the liquid was continued for the period stated. The appearance of the solution, the occurrence of aldehyde odor, and the presence of carbon and of tar in the chamber at the end of the test were noted. These details are given in the Table.

The metal test specimens present in the chamber were weighed at the start of each run and were reweighed, after polishing, at the end of the run. The losses in weight, calculated as milligrams per hour per square inch of exposed surface, are listed in the Table.

From the results listed it will be seen that in the absence of a stabilizer, aqueous ethylene glycol underwent considerable decomposition at 200° C. to form aldehydes and carbon. Each of the stabilizers effectively prevented decomposition, and the solution and apparatus remained free of tar and carbon. The rates of corrosion of the metal specimens were extremely low in all the runs.

*Example 2.—Undiluted glycol at 300° C.*

Tests similar to those of Example 1 were carried out on undiluted ethylene glycol, using 0.5 per cent of stabilizer, and maintaining the heated chamber at 300° C. The results are summarized in the Table.

From these tests, it is evident that the glycol itself decomposes very rapidly at 300° C. The stabilizers entirely prevented formation of carbon and tar, although some aldehydes were formed. Even under these extremely severe conditions, the marked effectiveness of the stabilizers, and the low rates of corrosion of the metal specimens, are quite apparent.

*Table*

| Stabilizer | Time, hrs. | Volume, cc. | Appearance | Aldehyde | Tar | Carbon | Corrosion Rate, mgm./hr./sq. in. | | | |
|---|---|---|---|---|---|---|---|---|---|---|
| | | | | | | | Aluminum | Iron | Brass | Copper |
| EXAMPLE 1.—70 PER CENT GLYCOL AT 200° C. | | | | | | | | | | |
| None | 100 | 2,565 | Rusty | Trace | None | Yes | 0.01 | 0.00 | 0.02 | 0.03 |
| Washed allyl oil | 100 | 2,640 | Clear blue | None | do | None | 0.01 | 0.04 | 0.03 | 0.01 |
| Autocondensed washed allyl oil. | 100 | 1,505 | Clear brown | do | do | do | 0.00 | 0.02 | 0.02 | 0.01 |
| EXAMPLE 2.—100 PER CENT GLYCOL AT 300° C. | | | | | | | | | | |
| None | [1] 12.5 | 1,020 | Dark brown | Strong | Excessive | Excessive | (Excessive carbonization rendered measurement impossible.) | | | |
| Washed allyl oil | 100 | 2,260 | Clear green | Trace | None | None | 0.03 | 0.10 | 0.12 | 0.01 |
| Autocondensed washed allyl oil. | 100 | 1,790 | do | do | do | do | 0.04 | 0.05 | 0.21 | 0.00 |

[1] Discontinued because of excessive decomposition.

What is claimed is:

1. A heat-transfer medium consisting essentially of a lower alkylene glycol containing from 2 through 5 carbon atoms per molecule and not over an equal proportion by weight of water stabilized against thermal decomposition by a small proportion of a substance selected from the class consisting of washed allyl oil and the autocondensate thereof in a proportion of from 0.2 to 5 percent by weight of the glycol.

2. A heat-transfer medium chemically stable at elevated temperatures consisting essentially of ethylene glycol and from about 0.2 to about 5 per cent by weight thereof of washed allyl oil.

3. A heat-transfer medium chemically stable at elevated temperatures consisting essentially of ethylene glycol and from about 0.2 to about 5 per cent by weight thereof of the autocondensate of washed allyl oil.

4. A liquid heat-transfer medium chemically stable at elevated temperatures consisting essentially of one part by weight of ethylene glycol, not over one part of water, and 0.005 to 0.05 part of washed allyl oil.

5. A liquid heat-transfer medium chemically stable at elevated temperatures consisting essentially of one part by weight of ethylene glycol, not over one part of water, and 0.005 to 0.05 part of the autocondensate of washed allyl oil.

6. In a process wherein a heat-transfer medium consisting essentially of a lower alkylene glycol containing from 2 through 5 carbon atoms per molecule and not over an equal proportion by weight of water is heated as a liquid for a prolonged period at an elevated temperature, the method of minimizing thermal decomposition of the liquid which comprises maintaining dissolved therein a small proportion of a substance selected from the class consisting of washed allyl oil and the autocondensate thereof in a proportion of from 0.2 to 5 percent by weight of the glycol.

7. In a process wherein ethylene glycol is heated as a liquid at an elevated temperature, the method of minimizing decomposition of the liquid which comprises maintaining dissolved therein from 0.2 to 5 per cent by weight of washed allyl oil derived from the distillation of hardwood.

8. In a process wherein ethylene glycol is heated as a liquid at an elevated temperature, the method of minimizing decomposition of the liquid which comprises maintaining dissolved therein from 0.2 to 5 per cent by weight of the autocondensate of washed allyl oil derived from the distillation of hardwood.

9. In a process wherein a liquid mixture of ethylene glycol and a lesser proportion of water is heated at an elevated temperature, the method of minimizing decomposition of the liquid which comprises maintaining dissolved therein washed allyl oil derived from the distillation of hardwood in a proportion of from 0.5 to 5 per cent by weight of the glycol.

10. In a process wherein a liquid mixture of ethylene glycol and a lesser proportion of water is heated at an elevated temperature, the method of minimizing decomposition of the liquid which comprises maintaining dissolved therein the autocondensate of washed allyl oil derived from the distillation of hardwood in a proportion of from 0.5 to 5 per cent by weight of the glycol.

EDGAR C. BRITTON.
ARTHUR R. SEXTON.

REFERENCES CITED

The following references are of record in the file of this patent:

UNITED STATES PATENTS

| Number | Name | Date |
|---|---|---|
| 1,988,584 | Dana et al. | Jan. 22, 1935 |
| 2,080,142 | Lowry et al. | May 11, 1937 |
| 2,214,251 | Lewis | Sept. 10, 1940 |
| 2,223,299 | Chesley | Nov. 26, 1940 |